(12) United States Patent
Niemelä

(10) Patent No.: US 6,452,914 B2
(45) Date of Patent: Sep. 17, 2002

(54) MOBILE TDMA/GSM SYSTEM WHICH USES A PLURALITY OF BITS FOR THE STEAL SYMBOLS/FLAGS

(75) Inventor: Kari Niemelä, Oulu (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/877,237

(22) Filed: Jun. 11, 2001

Related U.S. Application Data

(63) Continuation of application No. PCT/FI99/01065, filed on Dec. 21, 1999.

(30) Foreign Application Priority Data

Dec. 22, 1998 (FI) .................................................. 982779

(51) Int. Cl.[7] .................................................. H04J 3/00
(52) U.S. Cl. ........................ 370/337; 370/476; 370/523
(58) Field of Search ................................. 370/310, 321, 370/329, 330, 336–7, 345, 347, 350, 311, 474, 476, 478, 498, 503, 509, 514, 522, 523

(56) References Cited

U.S. PATENT DOCUMENTS

| | | | | |
|---|---|---|---|---|
| 5,717,686 A | * | 2/1998 | Schiavoni | 370/321 |
| 5,881,105 A | | 3/1999 | Balachandran et al. | |
| 5,905,733 A | * | 5/1999 | Solve et al. | 370/326 |
| 5,905,962 A | * | 5/1999 | Richardson | 455/506 |
| 6,032,052 A | * | 2/2000 | Richardson | 455/506 |
| 6,038,238 A | * | 3/2000 | Jokinen et al. | 370/337 |
| 6,084,865 A | * | 7/2000 | Dent | 370/321 |
| 6,097,772 A | * | 8/2000 | Johnson et al. | 370/345 |
| 6,125,148 A | * | 9/2000 | Frodigh et al. | 370/280 |
| 6,219,345 B1 | * | 4/2001 | Clark et al. | 370/328 |
| 2002/0002050 A1 | * | 1/2002 | Rinne et al. | 455/434 |

FOREIGN PATENT DOCUMENTS

| | | |
|---|---|---|
| GB | 2 260 245 | 4/1993 |
| WO | WO97/38540 | 10/1997 |
| WO | WO 98/07291 | 2/1998 |

OTHER PUBLICATIONS

Sugimura et al., "A reliable channel control method for wireless multimedia communications," 1995 Fourth IEEE International Conference on Universal Personal Communications, Nov. 1995, pp. 476–480.

* cited by examiner

*Primary Examiner*—David Vincent
(74) *Attorney, Agent, or Firm*—Pillsbury Winthrop LLP

(57) ABSTRACT

A signalling method in a wireless digital telecommunication system, where the signals between a base station and a terminal comprise bursts generated from symbols. The symbols comprise at least one stealing symbol indicating, if necessary, the use of a traffic channel for signalling. The symbols are generated from several bits by modulating and the stealing symbol is used for transmitting various signalling messages. A signalling message to be transferred is coded into a code word which is placed into one or more stealing symbols. The code word may be interleaved into the stealing symbols of several bursts. The method can be used, for example, for controlling the transmission power of the mobile station and the base station.

11 Claims, 2 Drawing Sheets

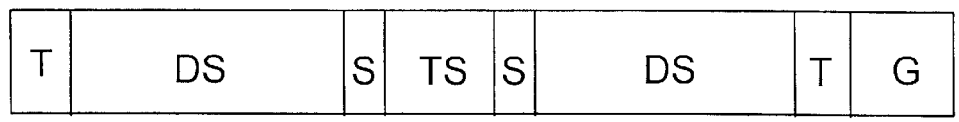
FIG. 1
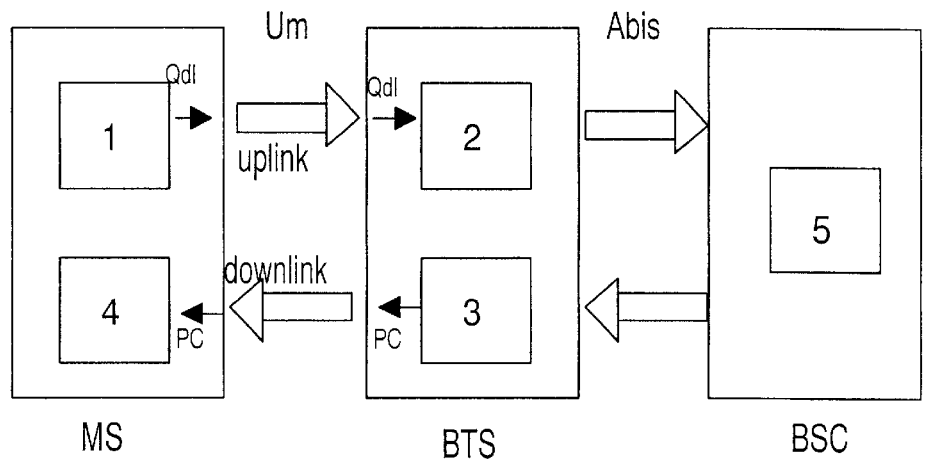
FIG. 2
| Codeword | Message |
|---|---|
| 1 | Even symbols for FACCH |
| 2 | Odd symbols for FACCH |
| 3 | PC=+4 dB |
| 4 | PC=+2 dB |
| 5 | PC= 0 dB |
| 6 | PC=-2 dB |
| 7 | PC=-4 dB |
| Codeword | Message |
|---|---|
| 1 | PC=+8 dB |
| 2 | PC=+6 dB |
| 3 | PC=+4 dB |
| 4 | PC=+2 dB |
| 5 | PC= 0 dB (default value) |
| 6 | PC=-2 dB |
| 7 | PC=-4 dB |
| 8 | PC= 0 dB (spare code value) |
FIG. 3a  FIG. 3b

| Codeword | Message |
|---|---|
| 1 | Qdl=0 (C/I=30 dB) |
| 2 | Qdl=1 (C/I=27 dB) |
| 3 | Qdl=2 (C/I=24 dB) |
| 4 | Qdl=3 (C/I=21 dB) |
| 5 | Qdl=4 (C/I=18 dB) |
| 6 | Qdl=5 (C/I=15 dB) |
| 7 | Qdl=6 (C/I=12 dB) |
| 8 | Qdl=7 (C/I=<9 dB) |
FIG. 4
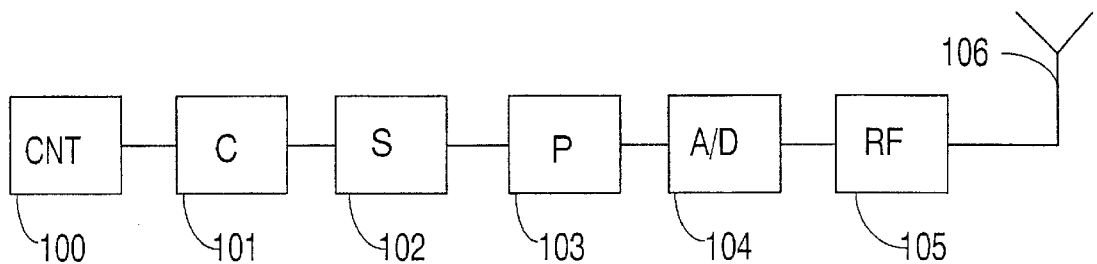
FIG. 5
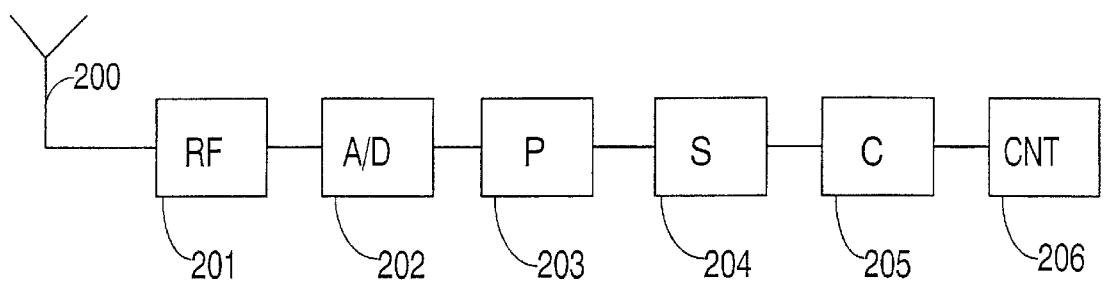
FIG. 6

MOBILE TDMA/GSM SYSTEM WHICH USES A PLURALITY OF BITS FOR THE STEAL SYMBOLS/FLAGS

This is a Continuation of International Application No. PCT/FI99/01065 filed Dec. 21, 1999 which designated the U.S. and which was filed in the English language.

The invention relates to a signalling method in a wireless digital telecommunication system between a base station and a terminal, where the signals between the base station and the terminal are generated from bursts comprising symbols, each of the symbols being generated from several bits by modulating, the symbols comprising at least one stealing symbol indicating, if necessary, the use of a traffic channel for signalling.

The invention further relates to a wireless digital telecommunication system for signalling between a base station and a terminal, where the signals to be transmitted over a radio connection between the base station and the terminal comprise bursts generated from symbols, each of the symbols being generated from several bits by modulating, the symbols comprising at least one stealing symbol indicating, if necessary, the use of a traffic channel for signalling, the system comprising at least one transmitter and at least one receiver, whereof the transmitter comprises means that include a transmitting signalling message and the receiver includes means for identifying the signalling message.

In digital radio systems, call-related signalling between a base station and a terminal occurs simultaneously with a call to be transferred on a traffic channel. The GSM system, for example, employs two signalling channels for conducting call-related signalling, a SACCH (Slow Associated Control Channel) and a FACCH (Fast Associated Control Channel). The SACCH is a separate low-rate signalling channel associated with each traffic channel. Due to its low rate the channel can be used for non-urgent signalling only. The FACCH is fast signalling within the traffic channel, and can be used for time-critical signalling. However, a part of the traffic channel capacity is then lost.

In digital radio systems, such as the GSM system, data transmission occurs in bursts, and a specific burst structure is determined for each purpose, like data and signalling transmission, synchronization or equalization. A normal burst used for data and signalling transmission comprises a training sequence in the middle which includes a set of predetermined symbols that the receiver identifies. When comparing the received training sequence with a known training sequence the receiver may create information of the distortion caused by an un-ideal radio path to the received signal. On the basis of this information the receiver can demodulate the received signal more efficiently. The applicant's previous patent application PCT/FI97/00465 describes a signalling method, in which a training sequence is used for signalling, that speeds up the signalling and leaves the entire traffic channel to be used by the payload.

The problem with the above system is the number of different training sequences required for transmitting versatile signals. One training sequence may describe one signalling message only and if the aim is to perform, for example, power control signalling including eight steps, eight different training sequences are required. If several signalling events are to be performed using the above method, the number of training sequences easily increases significantly. This increases the receiver load and complicates the implementation of the receiver, as the received training sequence must be separately compared with each known training sequence. Distinguishing training sequences from one another in particular becomes more difficult when the reception conditions are poor. Furthermore, when higher data transmission rates are aimed at, the use of a training sequence no longer guarantees fast enough signalling owing to the above and since the duration of the training sequence is relatively long bearing in mind that the training sequence is capable of transmitting one message only. Due to these drawbacks said method has not been widely employed and the GSM system, for example, still uses signalling channels.

It is thus an object of the invention to provide a method and an apparatus implementing the method so as to solve the above problems. The objects of the invention are achieved with a method, characterized by using said stealing symbol for transmitting different signalling messages.

The wireless digital telecommunication system of the invention is characterized in that the transmitter comprises means for coding different signalling messages, means for connecting the coded signalling message with the stealing symbols of the signal to be transmitted and means for modulating the signal so that each symbol comprises several bits and in that the receiver comprises means for demodulating the received signal comprising symbols, means for generating the coded signalling message from the stealing symbols in the received signal and means for decoding the coded signalling message.

According to a preferred embodiment of the invention a code word corresponding to a signalling message to be transferred is formed using stealing symbols. The code word is placed into one or more stealing symbols. According to another preferred embodiment of the invention said code word is interleaved into the stealing symbols of several bursts. According to a further preferred embodiment of the invention the method is used for adjusting the transmission power of the mobile station and the base station.

The invention is based on the idea that the stealing symbols in a burst structure are used for transmitting signalling information. Stealing symbols have typically been used in a normal burst to indicate whether the data bits in a burst are allocated to be used on a traffic channel or stolen to be used on the FACCH. When planning systems that use higher data transmission rates, a way to increase the data transmission rate is to use such modulation methods where several bits are modulated into a transferable symbol. Then, the data transmission capacity of one symbol increases, and the symbol can be used for transmitting more information.

An advantage with the method and system of the invention is the signalling rate that is approximately 25 times faster than the SACCH signalling. As the data transmission rates increase, the signalling rates must also be increased. Another advantage with the invention is that the data transmission capacity of the traffic channel is not used for the signalling according to the invention. The method of the invention utilizes the signalling capacity that would otherwise be unused. The invention also creates for the different logical traffic channel types a new common signalling procedure from the base station to the mobile station and vice versa that has not previously been available, for example, with power control or link adaptation. A further advantage of the invention is that the signalling load does not increase when utilizing the invention.

In the following the invention will be described in greater detail in connection with the preferred embodiments, with reference to the accompanying drawings, in which FIG. 1 schematically shows a normal burst according to the GSM system;

FIG. 2 schematically shows power control signalling in a digital radio system;

FIG. 3a is a table showing power control messages according to a preferred embodiment of the invention;

FIG. 3b is a table showing alternative power control messages according to a preferred embodiment of the invention;

FIG. 4 is a table showing channel quality parameters according to a preferred embodiment of the invention;

FIG. 5 is a block diagram showing a transmitter according to a preferred embodiment of the invention and FIG. 6 is a block diagram showing a receiver according to a preferred embodiment of the invention.

In the following the invention will be described by way of example on the basis of a TDMA-based (Time Division Multiple Access) GSM system and the further improvement thereof. It is obvious for those skilled in the art that the invention can be used in any corresponding telecommunication system.

FIG. 1 shows the structure of a normal burst according to the GSM system, the length of the normal burst being 156.25 and the duration 0.577 ms. The normal burst comprises one time slot of a TDMA frame comprising eight time slots. The normal burst comprises in the middle a training sequence (TS) that includes 26 symbols and that is used for correcting the received signal as described above. Stealing symbols (S), which are one symbol in length and located on both sides of the training sequence TS, are used for indicating the possible use of even and/or odd data symbols (DS) for FACCH signalling. The data symbols DS intended for transferring user and signalling data are divided into two sequences of 57 symbols which are located before the first stealing symbol and after the second stealing symbol. Tail symbol sequences (T), which are three symbols in length are located at the beginning and in the end of a burst, and within the duration of the tail symbols the transmitter is correspondingly switched on and off between the bursts. After the burst, there is a guard period (G) of 8.25 symbols that prevents adjacent time slots from overlapping in base station reception.

In a conventional GSM system, each symbol comprises one bit, and one symbol may describe two different states. However, the data transmission capacity of the GSM system has proved to be very limited, particularly when data services are used, wherefore different GSM standardization efforts have been undertaken in order to increase the data transmission capacity. An example of such an improvement project is referred to as EDGE (Enhanced Data rates for GSM Evolution). The basic idea of the EDGE is to use known GSM frame and burst structures and to increase the traffic channel capacity more efficiently by means of modulation. If, for example, an 8-PSK-modulation (Phase Shift Keying) is selected as the modulation, three bits are used to indicate one symbol which can then indicate eight different states. Therefore, if the stealing symbols are typically employed to indicate the use of the data symbols in a burst for FACCH signalling, a considerable amount of unused signalling capacity is left over for the stealing symbols that can preferably be utilized without simultaneously reducing the portion of user data from the payload to be transferred. Furthermore, the procedure is particularly useful in situations that require fast signalling, like transmitter power control or link adaptation. In the GSM system these measures are performed as SACHH signalling, but as the data rates increase the SACHH signalling rate is no longer sufficient for this purpose.

In the following the invention will be described in greater detail by means of an example associated with fast power control in a circuitswitched EDGE system and with reference to FIGS. 2–4. In the EDGE system more data is transferred for each time slot than in the conventional GSM system, whereby the user can be provided with higher data rates or fewer time slots can be used for transferring the same amount of data, thus reducing power consumption and interference. However, a more efficient modulation and higher data rates require a faster power control than the current one between the mobile station and the base station, in order to guarantee connection quality and to maximize data transmission capacity.

FIG. 2 schematically shows the functions of a mobile station (MS), a base transceiver station (BTS) and a base station controller (BSC) required in power control signalling and the data transmission between said functions. The data transmission from the base transceiver station BTS to the mobile station MS (downlink) and in the opposite direction (uplink) takes place over radio interface $U_m$. There is an Abis interface between the base transceiver station BTS and the base station controller BSC. For downlink power control the mobile station MS estimates in block 1, in a manner known per se, the channel quality of a signal received from the base transceiver station BTS, and as a result obtains a value for parameter $Q_{dl}$. Parameter $Q_{dl}$ is transferred to the base transceiver station BTS, which also receives from the power control and link adaptation function of the base station controller BSC, i.e. from block 5, normal downlink power control parameters determining the power levels to be adjusted. On the basis of the received parameters the base transceiver station BTS performs a fast downlink power control adjustment in block 2 and simultaneously informs the base station controller BSC about the power control parameters used.

For uplink power control of the mobile station MS the base transceiver station BTS estimates the channel quality in block 3 on the basis of the bursts received from the mobile station MS. The result of the estimation is a value for parameter $Q_{ul}$. In addition to the uplink power control parameters obtained from the base station controller BSC, parameter $Q_{ul}$ is used for determining a value for a power control parameter PC. The base transceiver station BTS sends the power control parameter PC to the mobile station MS performing the power control of the transmitter on the basis of the parameter in block 4. The base transceiver station BTS also informs the base station controller BSC about the power control parameters used.

Typically the signalling described above between the mobile station MS and the base transceiver station BTS has taken place as SACCH signalling. According to a preferred embodiment of the present invention the stealing symbols of a normal burst are used for signalling. Then, the desired signalling messages are coded into code words of a particular length and are added to the stealing symbols of a normal burst. The tables in FIG. 3a, 3b and FIG. 4 show an example of the signalling messages needed in the power control signalling described above. The table in FIG. 3a shows a five-step uplink power control arrangement where the value of the power control parameter PC varies from −4 dB to +4 dB. Two code words are also allocated to indicate the stealing of even and odd data symbols for the FACCH. FIG. 3b shows an alternative uplink power control arrangement including eight-step control messages. The power control parameters vary from +8 dB, corresponding to a control message indicating an increase of four power levels, to −4 dB, corresponding to a control message indicating a decrease of two power levels. The eighth control message is allocated as a spare code value. The table in FIG. 4 shows an eight-step scale for illustrating parameter $Q_{dl}$ describing the downlink channel quality. In this example the values 0–7 of parameter $Q_{dl}$ are determined on the basis of a C/I ratio (Carrier-to-Interference) of the channel.

According to a preferred embodiment of the invention the messages in the tables shown in FIGS. 3 and 4 are coded into 24-bit code words, which are determined in such a manner that the Hamming distances between the code words are sufficient in order to provide a detection that is as flawless as possible. The detection may preferably be based on searching for a minimum distance, in which case a detector searches for a code word that is closest to the received bit figure. If the system uses, for example, an 8-PSK-modulation, the two stealing symbols of the normal burst each comprise three bits, or six bits all together per burst. Then the 24-bit code word is interleaved into four bursts, which reduces the probability of the errors on the transmission path and thus increases the reliability of the data transmission. The user has typically been allocated a time slot from the TDMA frame, whereby the duration of one-way signalling is four TDMA frames i.e. less than 20 ms. This is approximately 25 times faster than the SACCH signalling currently in use.

The following describes the essential parts of the transmitter in the telecommunication system of the invention by means of the block diagram in FIG. 5. The transmitter comprises means 100 that include the information to be sent, for example, the parameter value shown in tables 3 or 4. This information is coded in accordance with the invention in coding means 101, from where the code words are applied to means 102 to be interleaved and connected with the stealing symbols of the signal to be transmitted. Next the signal is modulated by processing means 103 and applied to conversion means 104 where the signal is converted from digital to analogue mode. The analogue signal is transferred to radio frequency parts 105 where the signal is converted to the transmission frequency. Then the signal is sent by an antenna 106 through the radio path to the receiver.

The essential parts of the receiver in the telecommunication system of the invention are described in the block diagram according to FIG. 6. The receiver comprises an antenna 200 for receiving the signal sent through the radio path and wherefrom the signal is applied to radio frequency parts 201 in which the signal is converted to an intermediate frequency. The signal is then transferred to conversion means 202 where the signal is reconverted from analogue to digital mode. The digital signal propagates to processing means 203 where the signal may be filtered and demodulated, the channel impulse response and the energy thereof can be estimated, and the signal distorted on the channel can be restored into its original form. The restored signal is applied to separation means 204 where a code word interleaved into the stealing symbols of several bursts is separated from the signal. Decoding means 205 decode the received code word, and using means 206 start the operations according to the preferred embodiments that correspond with the message in the code word.

The above operations in the transmitter and the receiver can be implemented, for example, using general or signal processors or separate logic. To implement single operations is known for those skilled in the art and the description thereof is not needed in this context.

The signalling of the invention does not as such affect SACCH signalling, which may be used together with the signalling of the invention. An example of this is to determine the quality estimate $Q_{dl}$ of the downlink channel also by using the variance of the C/I ratio in addition to the C/I ratio of the channel. Non-time critical variance information can then be transferred as SACCH signalling, whereas parameter $Q_{dl}$ is transferred as the signalling of the invention. An alternative for implementing this is to multiplex to the output every second value as a code of parameter $Q_{dl}$ and every second as a value of the variance of parameter $Q_{dl}$ during one reporting sequence.

The uplink power control is arranged in the above example to be performed as a differential, i.e. as a determined change in relation to the previous value. However, the invention can also be implemented using absolute power control values. Furthermore, the values 0–7 of parameter $Q_{dl}$ are defined by way of example on the basis of the C/I ratio. It is obvious that the strength of the field or any corresponding variable can be used in this context for determining the channel quality. The scale can also be graded in various ways and deviate from the eight-step scale described above.

Another example of using SACCH signalling together with the invention can be carried out as interworking between normal and fast power control in the EDGE system. In a situation where no fast power control is needed, the power control signalling and radio link quality estimations can be performed through conventional SACCH signalling. When the fast power control of the invention is activated, the SACCH signalling can still be operating, but the power level commands sent through SACCH will be ignored by the mobile station MS. This advantageously enables the MS to easily switch back to the normal power control, since the MS always knows the power level to be used after switching. The switching between normal and fast power control preferably takes place at the beginning of a reporting period, the length of which typically being 104 TDMA frames in the EDGE system. The base station controller BSC controls which power control method is used. This can be indicated, for example, with one control bit, over the Abis interface to the base transceiver station BTS, which in turn informs the MS about which fast power control method of the invention is to be used.

An advantage with the invention is that despite the air interface signalling that has increased considerably, the amount of signalling taking place over the Abis interface between the base transceiver station BTS and the base station controller BSC does not increase at all in practice. The base transceiver station BTS and the base station controller BSC communicate to one another the normal power control parameters associated with SACCH signalling as well, in addition to which the base station controller BSC may determine the upper and lower limits for the control values in a power control situation. However, the signalling load in a fixed network does not actually increase on account of the inventive method, which is particularly preferable because the use of higher data rates increases the signalling of the Abis interface on other connections.

Even though the invention has above been described by way of example in connection with power control signalling, the invention is not restricted thereto but the signalling of the invention can be used for similar purposes in circuit-switched data transmission. The invention can in particular be utilized for transparent data transmission, where retransmission is impossible and the rate and reliability requirements concerning signalling are high.

Furthermore, the invention has not been restricted to said 8-PSK-modulation, but any modulation method can be used for implementing the invention where several bits are modulated into a symbol to be transferred so that the symbol comprises unused signalling capacity. The code words need not be 24-bits either, but the length thereof can be determined on the basis of the number of signalling messages to be used and the bit figure alternatives that guarantee an adequate reliability thereto. The code words can basically be coded to be 6 bits in length, and one code word can be transferred in the two stealing symbols of one normal burst. Then the signalling rate can be increased to be fourfold. Nevertheless the signalling will not be as reliable as if the code words are interleaved into several bursts.

It is obvious for those skilled in the art that as technology progresses the basic idea of the invention can be implemented in a number of ways. The invention and the embodiments thereof are thus not restricted to the above examples but may vary within the scope of the claims.

What is claimed is:

1. A signalling method in a wireless digital telecommunication system between a base station and a terminal, the method comprising steps:

generating the signals between the base station and the terminal from bursts comprising symbols, each of the symbols being generated from several bits by modulating;

indicating, if necessary, the use of a traffic channel for signalling by at least one stealing symbol comprised by the symbols; and using said stealing symbol for transmitting different signalling messages.

2. A method as claimed in claim 1, wherein an 8-PSK-modulation is used for generating the symbols.

3. A method as claimed in claim 1, further comprising forming a code word corresponding to the signalling message to be transferred using the stealing symbols; and placing said code word into one or more stealing symbols.

4. A method as claimed in claim 3, wherein said code word is interleaved into the stealing symbols of several bursts.

5. A method as claimed in claim 4, further comprising forming 24-bit code words from the signalling messages; and interleaving each of said code words into stealing symbols of four bursts.

6. A method as claimed in claim 1, wherein the method is used together with a separate signalling channel.

7. A method as claimed in claim 1, wherein the method is used for adjusting the transmission power of the mobile station and the base station.

8. A wireless digital telecommunication system for signalling between a base station and a terminal, in which system the signals to be transmitted on a radio connection between the base station and the terminal comprise bursts generated from symbols, each of the symbols are generated from several bits by modulating, which symbols comprise at least one stealing symbol, which indicate, if necessary, the use of a traffic channel for signalling, the system comprising at least one transmitter, which comprises means that include a signalling message to be transmitted, means for coding different signalling messages, means for connecting the coded signalling message with the stealing symbols of the signal to be transmitted and means for modulating the signal so that each symbol comprises several bits, and that at least one receiver, which comprises means for identifying the signalling message, means for demodulating the received signal comprising symbols, means for generating the coded signalling message from the stealing symbols in the received signal and means for decoding the coded signalling message.

9. A telecommunication system as claimed in claim 8, wherein the symbols are configured to be generated using an 8-PSK-modulation.

10. A telecommunication system as claimed in claim 9, wherein the signalling message comprises a 24-bit code word, and that the code word is configured to be interleaved into the stealing symbols of four bursts.

11. A telecommunication system as claimed in any one of claims 8 to 10, wherein the signalling messages comprise messages controlling the transmission power of the mobile station and the base station.

* * * * *